United States Patent
Gómez Benéitez et al.

(10) Patent No.: US 12,234,870 B2
(45) Date of Patent: Feb. 25, 2025

(54) BRAKE DEVICE

(71) Applicant: BRL BRAKE SOLUTIONS, S.L., Valladolid (ES)

(72) Inventors: José María Gómez Benéitez, Valladolid (ES); Fernando Gómez de Sebastián, Valladolid (ES)

(73) Assignee: BRL BRAKE SOLUTIONS, S.L., Valladolid (ES)

( * ) Notice: Subject to any disclaimer, the term of this patent is extended or adjusted under 35 U.S.C. 154(b) by 399 days.

(21) Appl. No.: 17/797,672

(22) PCT Filed: Jan. 27, 2021

(86) PCT No.: PCT/ES2021/070058
§ 371 (c)(1),
(2) Date: Aug. 4, 2022

(87) PCT Pub. No.: WO2021/156529
PCT Pub. Date: Aug. 12, 2021

(65) Prior Publication Data
US 2023/0057239 A1    Feb. 23, 2023

(30) Foreign Application Priority Data
Feb. 7, 2020   (ES) ............................... ES202030101

(51) Int. Cl.
*F16D 65/18*   (2006.01)
*B60T 1/06*    (2006.01)
(Continued)

(52) U.S. Cl.
CPC .............. *F16D 55/38* (2013.01); *B60T 1/065* (2013.01); *B60T 13/746* (2013.01); *F16D 55/30* (2013.01);
(Continued)

(58) Field of Classification Search
CPC .......... F16D 55/38; F16D 55/30; F16D 55/32; F16D 55/40; F16D 65/125; F16D 65/186;
(Continued)

(56) References Cited

U.S. PATENT DOCUMENTS

| | | | |
|---|---|---|---|
| 4,102,438 A * | 7/1978 | Rancourt | F16D 65/847 188/71.6 |
| 6,443,269 B1 * | 9/2002 | Rancourt | F16D 55/34 188/71.6 |

(Continued)

FOREIGN PATENT DOCUMENTS

| | | |
|---|---|---|
| CH | 551305 | 7/1974 |
| EP | 3572685 A1 | 11/2019 |

(Continued)

*Primary Examiner* — Thomas W Irvin

(74) *Attorney, Agent, or Firm* — The Webb Law Firm

(57) ABSTRACT

A brake device, configured to be installed directly on a driving axle or through a hub, wherein said device includes a first brake disc joined to the axle sharing rotary motion, a first container disc and a second container disc configured to be moved in the axial direction of said axle. The container discs are positioned on each side of the brake disc, such that both are configured to be moved in the axial direction towards the linings of the first brake disc and to exert a pushing pressure thereon, producing the braking of the brake disc and, therefore, of the driving axle whereon it is assembled. Furthermore, the container discs comprise an inner circuit configured to accommodate the passage of a coolant configured to cool them.

21 Claims, 8 Drawing Sheets

(51) Int. Cl.
*B60T 13/74* (2006.01)
*F16D 55/30* (2006.01)
*F16D 55/32* (2006.01)
*F16D 55/38* (2006.01)
*F16D 55/40* (2006.01)
*F16D 65/12* (2006.01)
*F16D 65/847* (2006.01)
*F16D 65/853* (2006.01)
*F16D 66/00* (2006.01)
*F16D 121/04* (2012.01)
*F16D 121/18* (2012.01)
*F16D 125/40* (2012.01)
*F16D 125/48* (2012.01)
*F16D 127/02* (2012.01)

(52) U.S. Cl.
CPC ............ *F16D 55/32* (2013.01); *F16D 55/40* (2013.01); *F16D 65/125* (2013.01); *F16D 65/186* (2013.01); *F16D 65/853* (2013.01); *F16D 66/00* (2013.01); *F16D 2066/001* (2013.01); *F16D 2121/04* (2013.01); *F16D 2121/18* (2013.01); *F16D 2125/40* (2013.01); *F16D 2125/48* (2013.01); *F16D 2127/02* (2013.01); *F16D 2200/0013* (2013.01); *F16D 2250/0007* (2013.01)

(58) Field of Classification Search
CPC ...... F16D 65/853; F16D 65/847; F16D 66/00; F16D 2066/001; F16D 2121/04; F16D 2121/18; F16D 2125/40; F16D 2125/48; F16D 2127/02; F16D 2200/0013; F16D 2250/0007; F16D 2055/0058; F16D 2065/784; B60T 1/065; B60T 13/746
USPC .................................. 188/71.5, 71.4, 264 A
See application file for complete search history.

(56) References Cited

U.S. PATENT DOCUMENTS

| | | | |
|---|---|---|---|
| 6,516,924 B1* | 2/2003 | Michael | F16D 65/853 188/71.6 |
| 6,536,564 B1* | 3/2003 | Garfinkel | F16D 65/128 188/218 XL |
| 7,556,128 B2* | 7/2009 | Mayberry | F16D 55/36 188/71.6 |
| 8,776,955 B2* | 7/2014 | Hakon | F16D 55/36 188/71.6 |
| 8,960,380 B2* | 2/2015 | McClintic | F16D 63/00 188/71.6 |
| 11,635,119 B2* | 4/2023 | Gómez Beneítez | F16D 55/32 188/71.6 |
| 2013/0180808 A1* | 7/2013 | McClintic | F16D 63/00 188/67 |
| 2013/0341136 A1 | 12/2013 | Boonpongmanee et al. | |
| 2020/0217381 A1* | 7/2020 | Gómez Beneítez | B60T 5/00 |

FOREIGN PATENT DOCUMENTS

| | | | |
|---|---|---|---|
| ES | 2705358 A1 | 3/2019 | |
| ES | 2886671 A1 * | 12/2021 | ............ F16D 55/28 |

* cited by examiner

BRAKE DEVICE

CROSS-REFERENCE TO RELATED APPLICATIONS

This application is the United States national phase of International Application No. PCT/ES2021/070058 filed Jan. 27, 2021, and claims priority to Spanish Patent Application No. P202030101 filed Feb. 7, 2020, the disclosures of which are hereby incorporated by reference in their entirety.

BACKGROUND OF THE INVENTION

Field of the Invention

The present disclosure consists of a brake device with a novel system which increases the braking capacity, reducing the wear on the usual components and comprising a cooling system which guarantees the thermal stability of the brake discs.

The present disclosure has applications in different industrial fields, mainly in the automotive industry, such as the railway or aviation industries, as well as in all those industries wherein brake devices operate.

Description of Background Art

In the state of the art, many braking systems with different types of configurations are known, the automotive sector specifically being where greater research and development has been carried out in this field, generating different types of braking systems based on the needs of the vehicle.

The most well-known braking system in the automotive sector is the brake disc braking system, wherein once the brake pedal is actuated, a hydraulic, pneumatic or electrical system is activated that moves brake pads towards a disc that rotates jointly with the wheels of the vehicle, such that, by means of friction between the brake pads and the disc, the braking of the wheels and consequently of the vehicle takes place.

In this braking system, the brake disc, as already stated, continuously and jointly rotates with the wheels of the vehicle while the pads are in a fixed position with respect to the wheel. By moving the pads axially towards the brake disc, until they make contact with the disc, and by continuing to exert pressure on it, a friction is generated that causes the braking of the disc and therefore the braking of the wheels of the vehicle, consequently causing overheating between the parts in contact.

Due to the fact that the brake disc is constantly rotating, the only cooling that is obtained is due to the flow of air it receives from natural convection. Likewise, given the surface, material and configuration of the brake pads, it is extremely complex to have a cooling system therein which evacuates the heat generated.

Apart from the overheating, in the systems known in the state of the art there is wear on the pads and on the brake disc due to intermittent friction between these two elements, such that the useful life of the pads and of the brake discs is limited.

Spanish patent ES2705358 describes a brake device comprising a container joined to two cast iron discs which together comprise a brake disc which does not rotate jointly with the axle, but remains fixed, being a supporting disc with a lining on one of the sides thereof, the one which rotates with the axle. The container comprising the two cast iron discs comprises an axial movement with respect to the axle which enables it to make contact with the lining positioned on one side of the supporting disc, producing the braking, at the same time that it is cooled by means of a fluid which flows through it.

Document CH 551305 A refers to a liquid-cooled disc brake system for non-driven axles of heavy motor vehicles and trailers.

Document US 2013/341136 A1 relates to a water cooled brake, particularly to a braking system which includes at least one rotating disc and braking disc.

SUMMARY OF THE INVENTION

The present disclosure refers to a braking system which solves the aforementioned problems and which improves the efficiency of the developed systems present on the market.

In this manner, the present disclosure consists of a brake device, to be installed on an axle comprising:
  a first brake disc comprising:
    a supporting disc assembled on the axle, configured to share rotation with said axle and to be moved in an axial direction with respect to said axle;
    a first lining rigidly assembled on a first surface of the supporting disc; and
    a second lining rigidly assembled on a second surface of the supporting disc, opposite from the first surface;
  a first container disc, configured to be moved only in the axial direction of said axle; and
  a second container disc configured to be moved only in the axial direction of said axle, or to remain stationary.

In this manner, the brake disc shares rotational motion with the axle whereon it is assembled, rotating together, but the brake disc having the ability to be moved axially with respect to the axle, maintaining one same orientation. At the same time, the first and second container discs lack the ability to rotate jointly with the axle and the brake disc, only comprising the ability to be moved in the axial direction.

The brake disc can be mounted directly on the axle or through a hub, in the same manner that, in order to be able to be moved in the axial direction, the device can comprise a guide disc, rigidly connected to the axle directly or through the hub, said guide disc being what enables the axial movement of the brake disc with respect to the axle.

The first brake disc is positioned between the first container disc and the second container disc, such that, when the device is not exerting the braking, said discs are separated by a space which prevents the friction between them.

In order to brake the brake disc, the first container disc is configured to be moved in the axial direction of the axle towards the first lining of the first brake disc. When the first container disc, as it is moved, makes contact with said first lining, it exerts a pressure on the surface thereof which generates a friction and, therefore, the braking of the supporting disc.

In the same manner, when the pressure exerted continues, the first container disc is configured to exert a pushing pressure on said first lining in the same axial direction, wherein it moves the first brake disc.

The simplest embodiment of the device consists of the first container disc being moved against the brake disc in the axial direction exerting a first friction against the first lining, generating braking. Since said friction may not be enough to produce the desired braking, the brake disc continues to be moved, until the second lining makes contact with the second container disc, which remains stationary, doubling the friction contact surface, producing the tightening on both sides of the brake disc, generating a clamping effect on the brake disc.

In order to reduce the temperature reached by the container discs, each one of them comprises an inner circuit configured to accommodate the passage or flow of a coolant configured to cool it, reducing the temperature which can be reached by friction with the lining.

In another embodiment, the second container disc does not remain stationary, but rather is moved towards the second lining of the brake disc, having the ability to exert a pushing pressure on said second lining and to move said first brake disc with respect to the axle towards the first container disc. In other words, it can move the brake disc in the direction opposite from the one performed by the first container disc. In this manner, a pushing pressure can be exerted on the two linings at the same time by each of the container discs, in a distributed and regular manner.

Another embodiment of the brake device comprises:
a third container disc positioned between the first brake disc and the second container disc, configured to be moved only in the axial direction of the axle or to remain stationary; and
a second brake disc, jointly assembled on the axle, configured to be moved in the axial direction with respect to said axle, positioned between the second and third container discs;
the third container disc being identical to the first and the second container discs, and the second brake disc being identical to the first brake disc. In other words, they have the same technical features being isolated from the device.

In this manner, the third container disc is configured to exert a pushing pressure on the second lining of the first brake disc and on the first lining of the second brake disc.

This embodiment comprises two embodiments at the same time. A first one wherein, in order to produce the braking of the axle, the first container disc moves the first brake disc, which pushes the third container disc and the latter pushes the second brake disc up to the second container disc which remains stationary. In this manner, the movement of the discs is only produced in an axial direction, and a tightening of all the faces of the two brake discs is produced against the container discs.

The other embodiment consists of the second container disc not remaining stationary, but rather being configured to be moved in the axial direction, towards the second lining of the second brake disc, exerting a pushing pressure on said second lining, and moving said second disc brake along the axle towards the third container disc. In this manner, the first and second container discs are moved towards the third container disc, which remains stationary, moving the brake discs positioned on each of the sides thereof. As in the previous embodiment, the tightening of each face of the two brake discs is also produced against the container discs, having performed a movement of the container discs positioned on the ends, in opposite directions, towards the intermediate disc.

These indicated embodiments also enable the device to comprise, not only three, but rather a plurality of container discs, as well as brake discs, arranged interspersed in the manner described.

In one embodiment, the brake device comprises at least one piston configured to generate a pushing load on a container disc positioned on one of the sides or ends of the brake device, moving said container disc in the axial direction along the axle. In other words, the pistons are only located on the ends of the braking device, next to the container discs which are not surrounded on both sides by brake discs.

In the simplest embodiment, wherein the movement of the discs is only produced in one direction of the axial direction, the device only requires a piston configured to push the first container disc; meanwhile, if the movement of the second container disc is required, performing a movement of the container discs positioned on the ends towards the inside, the system comprises two pistons, one on each side or end of the brake device.

In one embodiment, the system comprises at least one fixed casing, in other words, it does not rotate or move, configured to be rigidly fastened to a frame such as of a vehicle, a grip, a chassis or a differential, by means of a bell coupling, said casing being able to be mounted around an axle or a hub, and configured to accommodate the piston in an inner cavity.

In the same manner that the system can comprise one or two pistons, it can also comprise one or two casings positioned on each side of the container discs positioned on the ends of the system.

In one embodiment, the system comprises an electric motor fastened to the at least one casing, configured to actuate a gear which is configured to move the piston in the axial direction, with respect to the casing. In this manner, said gear can move the piston in both directions of said axial direction.

In one embodiment, the gear comprises a gear wheel connected to the motor and a pinion, meshed with the gear wheel and assembled on the piston by means of a joint with a helical worm screw, which is accommodated in a tubular helical seat of the piston, wherein when the motor is actuated, the gear wheel makes the pinion rotate and the latter, by means of the helical screw, producing the movement in the axial direction of the piston.

In one embodiment, the device comprises a hose connected to the at least one casing by a second casing hole, configured to introduce a fluid into the inner cavity, moving the piston in the axial direction. This configuration also requires a bleeder which enables the fluid to be evacuated from the inner cavity.

In one embodiment, the device comprises at least one first compression spring positioned between each container disc of the device, said first compression spring configured to exert a separating pressure between said container discs. Thus, if the device were to comprise three container discs, there would be a first spring between each of them in order to separate them when no pushing load is exerted.

In the brake device, each container disc comprises:
a first hole to access the inner circuit; and
a second hole to access the inner circuit;
wherein the coolant is configured to travel through the inner circuit accessing through the first hole and coming out through the second hole.

These holes are positioned on a perimeter surface of the container disc and comprise a transverse direction, in order to not interfere with the brake discs when the braking is produced.

In one embodiment, the device comprises tubes which connect the first hole and the second hole of the container discs with a heat exchanger for the coolant. Preferably, these tubes distribute the coolant parallel to the container discs.

In one embodiment, the device comprises at least one sensor in each of the container discs configured to measure the temperature of the coolant. Preferably, these sensors are positioned in the first and second holes, to measure the inlet and outlet temperature of the liquid to each of the container discs.

In one embodiment, at least one of the container discs comprises fastening means configured to fasten said container disc to a frame. In this manner, the element for fastening the brake device to the frame or chassis of the vehicle to which it is coupled is the container disc, with the rest of the parts being floating, such as the casings, the brake discs and the container discs lacking fastening means.

In another embodiment, both the casings and the container discs of the brake device are configured to be fastened to the frame, with only the brake discs being floating.

In one embodiment, the at least one casing comprises a plurality of first casing through holes, arranged on an outer perimeter, being able to be in lugs of said casing. Said first holes comprise the axial direction and each of the container discs comprise a plurality of perimeter lugs, each one of them comprising a lug through hole in the axial direction.

In this embodiment, the brake device comprises a plurality of guide screws, each of them inserted into a first hole of the at least one casing, and into a lug hole of each of the container discs, regardless of the number of container discs of the device. In other words, the container discs are parallel. The guide screws are configured to guide the movement of said container discs in the axial direction of the axle or hub, maintaining the orientation thereof with respect to said axle.

In a preferred embodiment, the device comprises a plurality of first compression springs, each of them mounted concentrically on each guide screw, said first compression springs positioned between every two container discs arranged contiguously, separated by a brake disc, said first compression springs configured to exert a separating pressure between said container discs.

In one embodiment, the supporting disc is formed by a cast iron part comprising:
  a central disc through hole comprising the axial direction;
  a plurality of fins arranged on the perimeter of the central through hole; and
  at least one sliding joint accommodation, positioned on the perimeter of the central hole, comprising the axial direction.

Said supporting disc formed by a cast iron part can comprise a cylindrical, regular or irregular polygonal shape, depending on the braking needs and on the manufacturing conditions.

In a preferred embodiment, the device comprises at least one guide disc comprising:
  a central guide through hole comprising the axial direction;
  at least one guide shaft positioned in a position eccentric to the central guide hole and comprising the axial direction;
  wherein the guide disc is rigidly fastened to the axle or hub, the axle being able to cross through the central guide hole, and the guide disc assembled on a supporting disc in a joint sliding in the axial direction. In this manner, the central guide hole is concentric to the central disc through hole and the axle or hub, and the sliding joint is due to the fact that at least one guide shaft is accommodated in the at least one accommodation of the supporting disc.

Preferably, the guide disc comprises six guide shafts positioned regularly, and the supporting disc comprises six accommodations to be inserted through said guide shafts.

In one embodiment, the device comprises at least two second compression springs mounted concentrically on each guide shaft, wherein one of said two second compression springs is positioned between a first end of the guide shaft and the supporting disc and the other second compression spring is positioned between the supporting disc and a second end of the guide shaft.

In this manner, when no pushing load is exerted and the container discs are separated, the brake discs also comprise a separation in the axial direction of the containers surrounding them, preventing undesirable friction that can cause braking.

In one embodiment, the device comprises a hub rigidly assembled on the axle and to at least one guide disc. This assembly is made from joints which cross through at least one bore in the guide disc comprising the axial direction and bores of the hub.

In one embodiment, each of the container discs is formed by a hollow circular cylinder, a cavity wherein the inner circuit is located, which are manufactured in a single part, by casting, and comprise a central container through hole so that the axle or the hub can cross through them. Furthermore, the inner circuit comprises at least one internal wall configured so that the coolant surrounds an entire inner perimeter of the disc, and the cooling is regular, with a cheaper and simpler manufacturing process.

In another embodiment, instead of being manufactured in a single part, the container discs are formed by two assembled parts. A cylinder with an open accommodation on one of the bases thereof, manufactured in a single part, by casting, comprising a C-shaped cross section, assembled on a cast iron disc through the open base thereof. This assembly between the container disc and the cast iron disc comprises a hollow cylinder with a central container through hole and at least one internal wall configured so that the inner circuit surrounds an entire inner perimeter of the disc. With this embodiment, the cast iron disc is what performs the pushing and friction with the linings of the brake discs, being able to have suitable structural and resistive features to do so.

In one embodiment, at least one container disc and/or one of the casings comprised in the device are coupled to the axle by means of a bearing, such as a ball bearing. Said bearing enables said elements to rest on the axle, transmitting the transverse loads, but without sharing the torsional rotation of the axle, and guaranteeing the axial parallelism thereof.

Another invention consists of the container disc, for a brake device, comprising a hollow circular cylinder manufactured in a single part, by casting, and comprising:
  a central through hole comprising an axial direction;
  an inner circuit configured to accommodate the passage of a fluid;
  a first hole to access the inner circuit;
  a second hole to access the inner circuit;
  at least one internal wall configured so that the inner circuit surrounds the entire inner perimeter of the disc; and
  a plurality of perimeter lugs, each comprising a lug through hole in an axial direction.

In one embodiment of said container disc, the first and second access holes to the inner circuit are positioned in a different area than the friction and pushing area, preferably on the side or perimeter area of the container disc, comprising a transverse direction.

Another invention consists of a brake disc for a brake device:
  a supporting disc formed by a cast iron part;
  a first lining rigidly assembled on a first flat surface of the supporting disc; and a second lining rigidly assembled on a second flat surface of the supporting disc.

Said supporting disc formed by a cast iron part can comprise a cylindrical, regular or irregular polygonal shape, depending on the braking needs and on the manufacturing conditions.

In one embodiment, said brake disc comprises:
a central through hole comprising an axial direction;
a plurality of fins arranged on the perimeter of the central through hole; and
at least one accommodation positioned on the perimeter of the central hole, comprising an axial direction.

Both the brake disc and the container disc described are configured to be used in the brake device described above in any of the embodiments.

The described invention of the brake device has a series of advantages with respect to the disclosure contained in document ES2705358, which are described below:
at least two container discs are used, instead of one, each manufactured in a single part, instead of one container with two discs joined to the sides, which provides:
greater cooling capacity;
more homogeneous heat distribution in the two container discs;
decrease in torsional stress in each of the two container discs, in relation to the single container of document ES2705358;
fewer parts are required, which simplifies manufacturing, as well as the assembly and disassembly; and
the amount of material to be used in the manufacturing process is reduced;
the brake disc is squeezed on both sides thereof, which provides a much higher friction and therefore a greater braking capacity;
it enables a more efficient operation with a single brake disc by having linings on each side of the supporting disc;
a more homogeneous compression of the brake pads is produced, as a clamping effect is generated on the brake disc;
the bending of the two pad supporting discs, which could lose the parallelism with the lid discs of the container, disappears, thus solving this problem and guaranteeing the friction coefficient when exerting higher braking;
the system is compatible with electric actuation;
the guide disc enables the axial movement of the brake disc while efficiently transmitting the rotation for the operation of the system. Furthermore, this axle disc is designed so that it can be coupled to any hub that exists on the vehicle market. It enables braking torque to be universally transferred to the driving axle or hub; and
the supporting disc has fins which enable the generation of an air flow like a turbine during the rotation thereof, which enables the convection cooling of the installed linings, while at the same time driving the lining particles towards the outside.

BRIEF DESCRIPTION OF THE DRAWINGS

To complete the description, and for the purpose of helping to make the features of the present disclosure more readily understandable, this specification is accompanied by a set of drawings constituting an integral part of the same, which by way of illustration and not limitation represent the following.

Figure 1A:
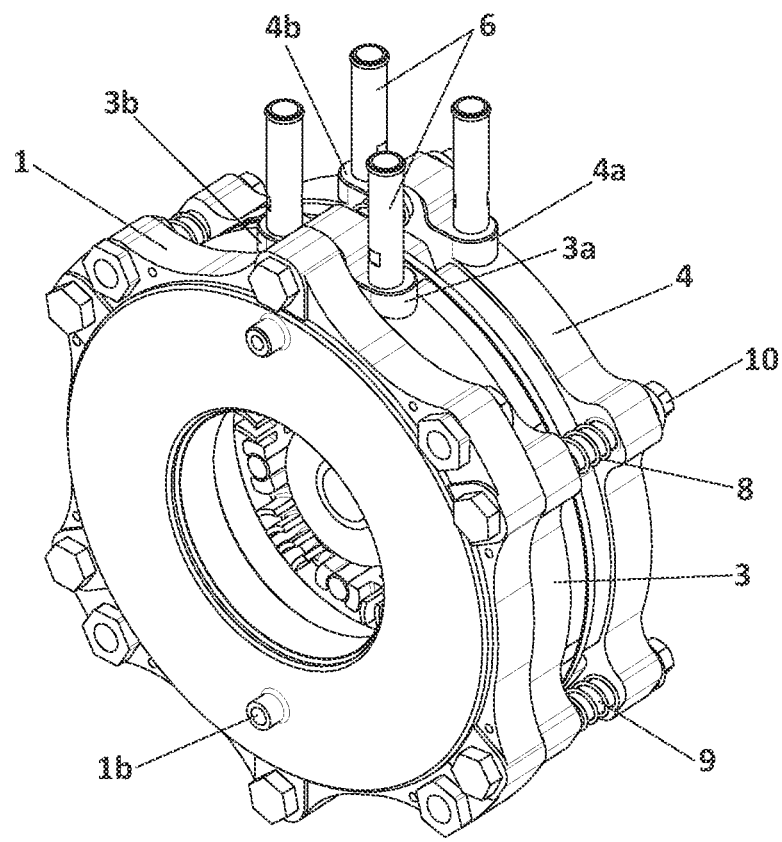
FIG. 1a shows a perspective view of the first embodiment of the brake device object of the present disclosure, wherein the first and second container discs can be seen, with a brake disc between both of them and a single casing next to the first container disc.
Figure 1B:
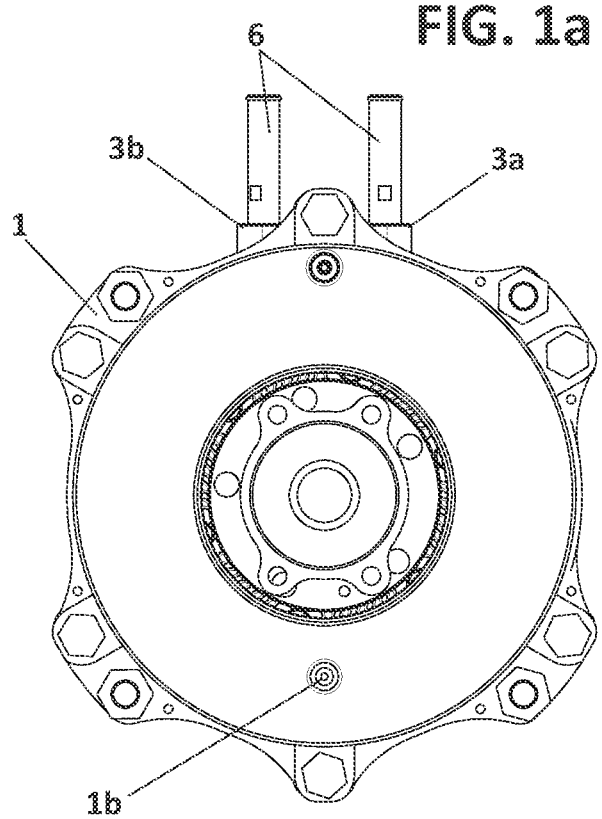
FIG. 1b shows an elevation view of the first embodiment of the brake device object of the present disclosure.
Figure 1C:
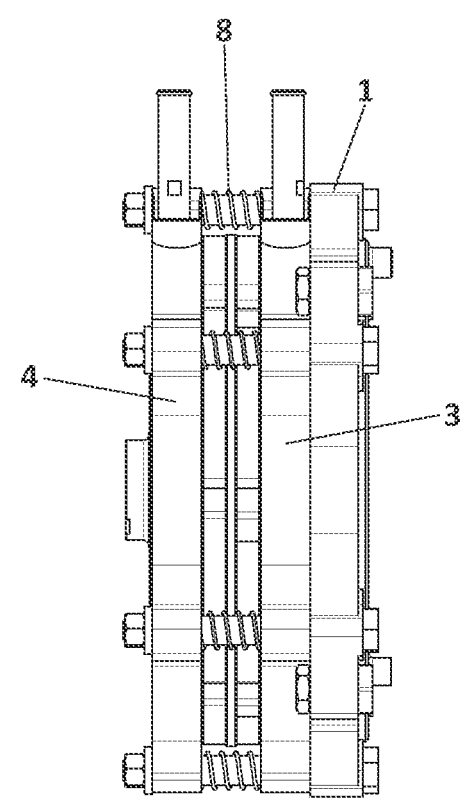
FIG. 1c shows a profile view of the first embodiment of the brake device object of the present disclosure.

A list of the numerical references used in the depicted figures is provided below:
1.—casing
   1a.—first casing hole,
   1b.—second casing hole,
   1c.—inner cavity,
   1d—bleeder,
2.—piston,
3.—first container disc,
   3a.—first hole of the first container disc,
   3b.—second hole of the first container disc,
   3c.—perimeter lug of the first container disc,
   3d.—lug hole of the first container disc,
4.—second container disc,
   4a.—first hole of the second container disc,
   4b.—second hole of the second container disc,
   4c.—perimeter lug of the second container disc,
   4d.—lug hole of the second container disc,
5.—supporting disc,
   5a.—first lining,
   5b.—second lining,
   5c.—accommodation,
   5d.—fins,
   5e.—central disc through hole,
6.—tubes,
7.—guide disc,
   7a.—guide shafts,
   7b.—bore,
   7c.—central guide hole,
8.—first compression spring,
9.—guide screw,
10.—nut,
11.—hub,
12.—third container disc,
   12a.—first hole of the third container disc,
   12b.—second hole of the third container disc,
   12c.—perimeter lug of the third container disc,
   12d.—lug hole of the third container disc,
13.—cast iron disc,
20.—motor,
21.—gear wheel,
22.—pinion,
23.—second compression spring, and
100.—axle.

DETAILED DESCRIPTION OF THE INVENTION

As seen in FIGS. 1a-1c and FIG. 2, the preferred invention, in the simplest embodiment thereof, consists of a braking device comprising a first brake disc which in turn comprises a cylindrical supporting disc (5), with a reduced thickness compared to the diameter thereof, which has a first lining (5a) and a second lining (5b) fastened to each side, said linings (5a, 5b) being a plurality of brake pads.

This first brake disc is assembled on an axle (100), through a hub (11), sharing the torsional rotation, but it comprises a joint sliding in the axial movement on the axle (100) so that said first brake disc has the ability to be moved in said direction, in both orientations.

Figure 4A:
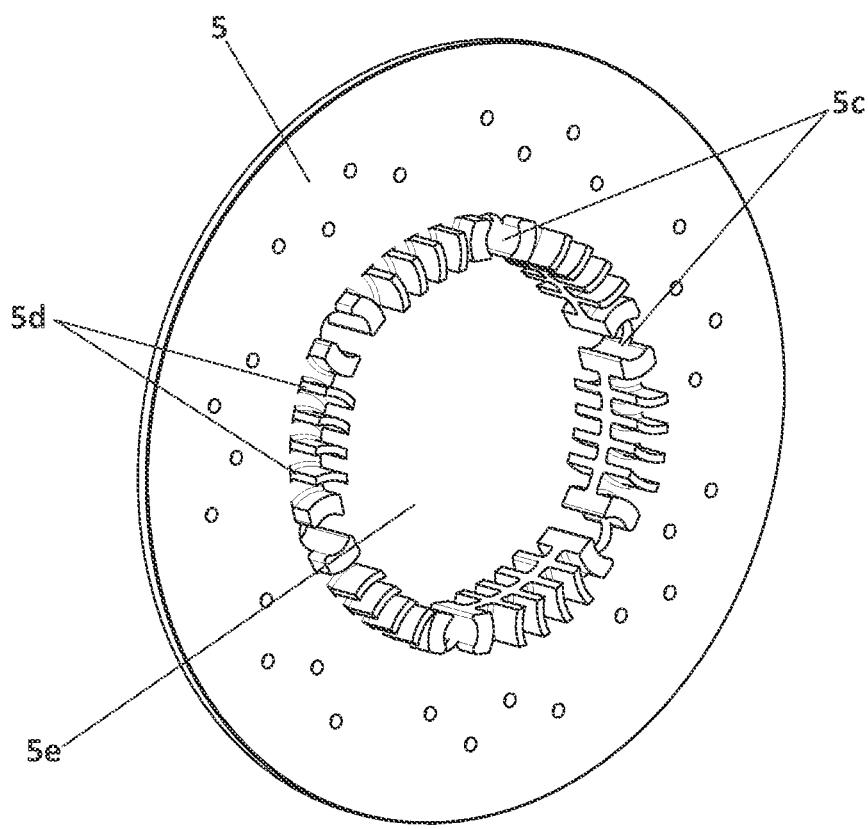
FIG. 4a shows a perspective view of the supporting disc, wherein the central through hole, a plurality of fins arranged on the perimeter of the central through hole and six accommodations positioned on the perimeter of the central hole are observed, comprising an axial direction.
Figure 4B:
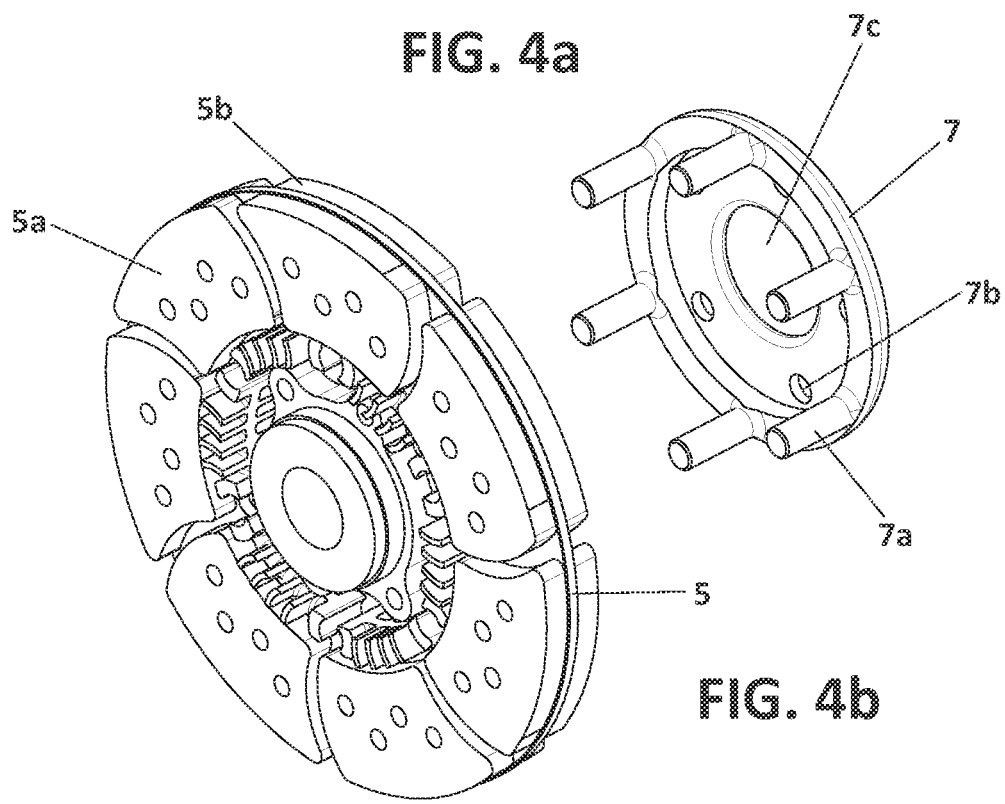
FIG. 4b shows an exploded perspective view of a brake disc with a guide disc, wherein it can be seen how each of the six guide shafts fit into a sliding joint in the six accommodations of the supporting disc.
Figure 4C:
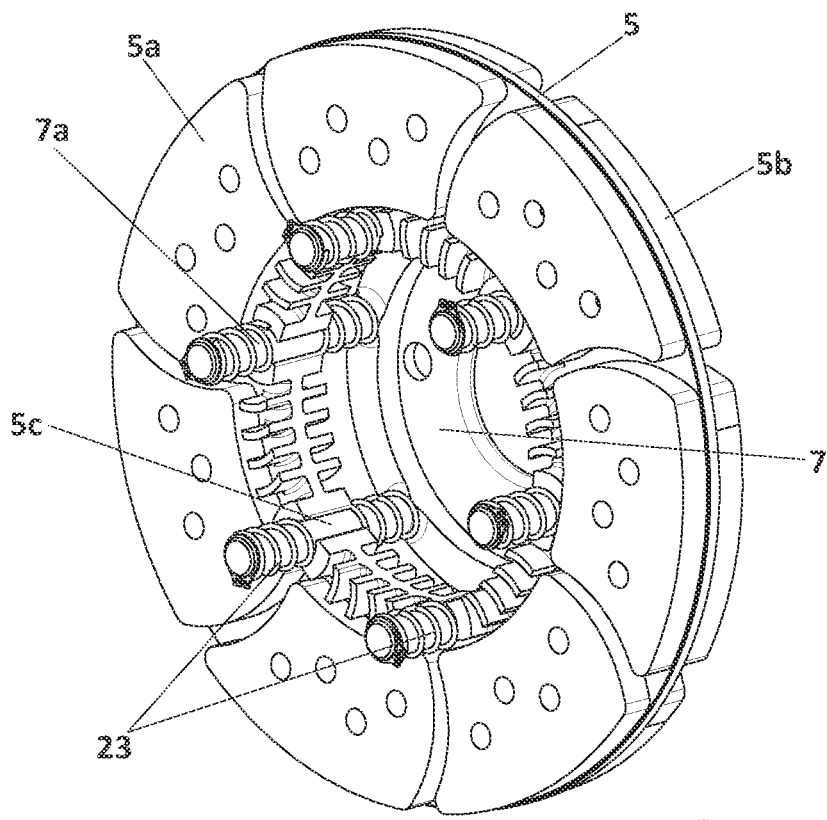
FIG. 4c shows a perspective view of the brake disc assembled on the guide disc, wherein it can be seen how each of the six guide shafts comprises two second compression springs positioned on each side of the supporting disc.
Figure 4D:
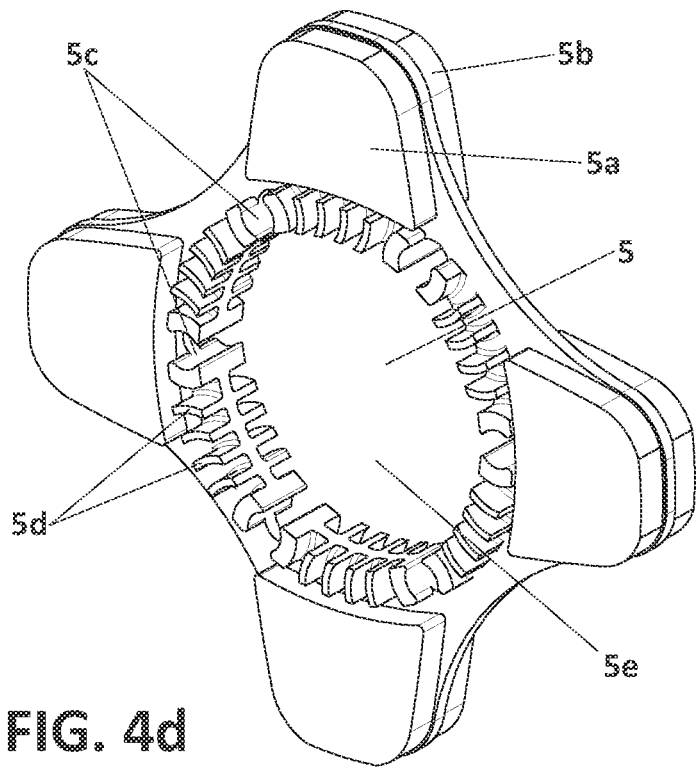
FIG. 4d shows a brake disc wherein the supporting disc comprises a cross shape, being one of the possible shapes that the supporting disc of the brake disc of the present disclosure may comprise.

This assembly of the first brake disc with the axle (100), which enables the axial movement at the same time as the joint rotation with the axle (100), is due to the configuration of the first brake disc itself and the presence of a disc guide (7), shown in FIG. 4b.

As seen in FIG. 4a, the supporting disc (5) of the first brake disc comprises a central disc through hole (5e), concentric to the supporting disc (5) itself, through which the axle (100) is inserted. A plurality of fins (5d) is positioned on the perimeter of said central disc through hole (5e) which facilitate the cooling of the supporting disc (5) and the set of linings (5a and 5b), when the latter is rotating, and six accommodations (5c) positioned regularly between said fins (5d), comprising a cylindrical shape with the same axial direction as the central disc through hole (5e).

Moreover, the guide disc (7) comprises a central guide hole (7c), also being crossed through by the axle (100), and therefore, concentric to the central disc through hole (5e), and six guide shafts (7a), consisting of six cylindrical projections oriented in the axial direction, regularly arranged on the outer perimeter of the guide disc (7). The six guide shafts (7a) are inserted into the six accommodations (5c), with a clearance which only enables the axial movement of the first brake disc with respect to said guide disc (7), such that the supporting disc (5) and the guide disc (7) collaborate together in order to transfer the braking effect from the linings (5a) and (5b) to the rotating axle and/or hub.

The guide disc (7) is rigidly assembled on the axle (100) by means of a hub (11), to which it is connected by means of five bolted joints which cross through five other respective bores (7b) of the guide disc (7) and of the hub (11).

On each side of the first brake disc, the device comprises two identical container discs (3, 4). The first container disc (3) positioned next to the first lining (5a) and the second container disc (4) positioned next to the second lining (5b).

The operation of the device consists of, while the axle (100) and the first brake disc are rotating jointly, the container discs (3, 4) being stationary and separated a small distance from each of the linings (5a, 5b); such that, when said first brake disc is to be braked, the first container (3) is moved in the axial direction towards the first lining (5a) producing a contact, and therefore, a friction. If the first container disc (3) continues to exert a pushing load on the first lining (5a) which moves the first brake disc in the same axial direction until the second lining (5b) makes contact with the second container disc (4) and a second friction is produced on both sides of the first brake disc, generating a clamping effect and producing the braking torque on the brake disc.

In order for the container discs (3, 4) to not overheat and generate problems of crystallization in the brake pads of the linings (5a, 5b), they have a cooling system. Said system comprises an inner circuit, for each of them, through which a coolant flows which enters through a first hole of the first container disc (3a) and through a first hole of the second container disc (4a) and is extracted through a second hole of the first container disc (3b) and through a second hole of the second container disc (4b).

Said coolant is led by tubes (6) connected to the first holes (3a, 4a) and second holes (3b, 4b) to a heat exchanger, wherein the liquid reduces the temperature thereof and is once again recirculated to the container discs (3, 4).

Figure 2:
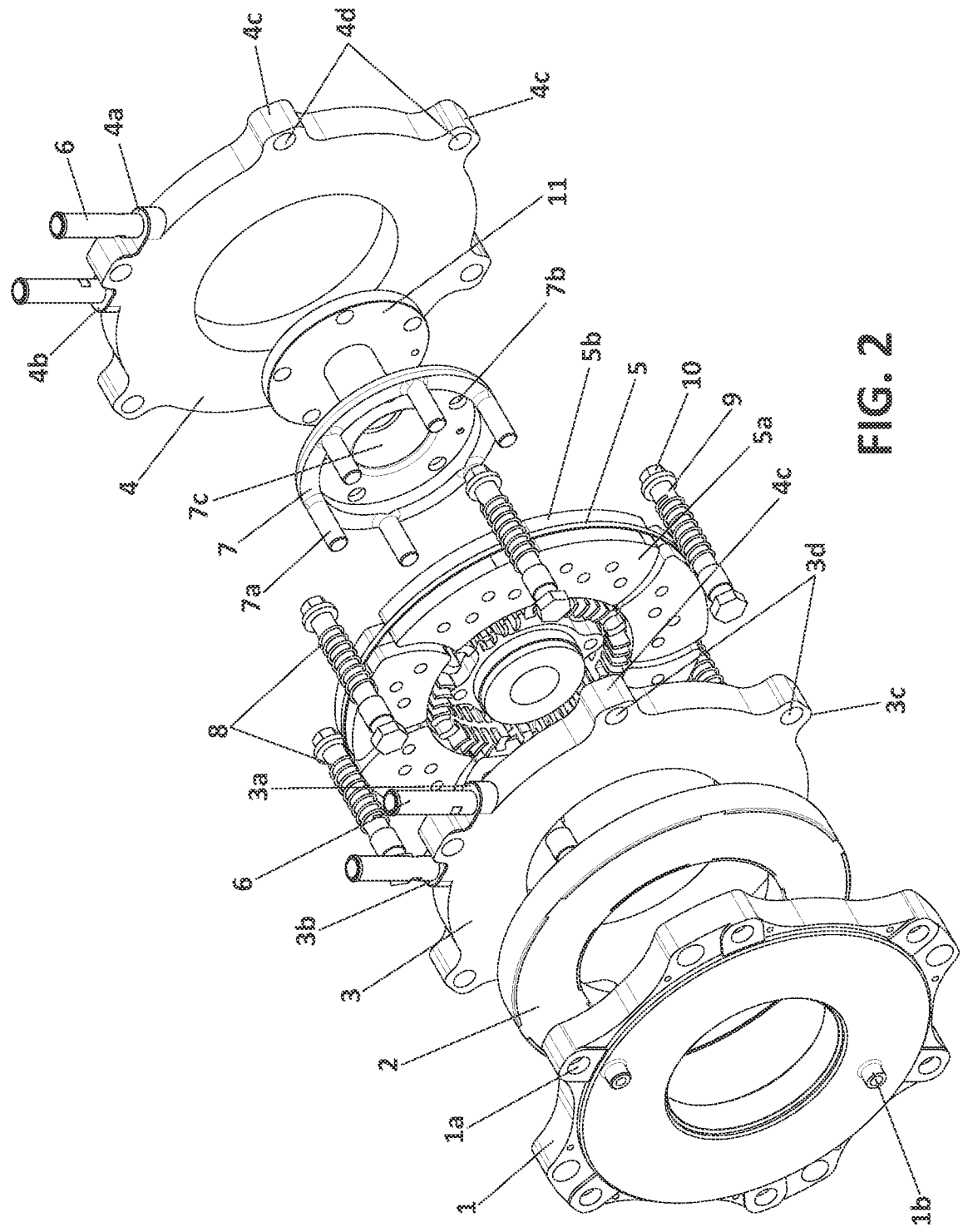
FIG. 2 shows an exploded perspective view of the first embodiment of the brake device object of the present disclosure.

FIG. 2 also shows a piston (2) positioned next to the first container disc (3) on the side opposite from that wherein the first brake disc is positioned. This piston (2) is what generates the movement of said first container disc (3) in the axial direction towards the first lining (5a).

The piston (2) is accommodated in an open inner cavity (1c) of a casing (1), which is positioned, on one side of the piston (2), and concentrically to both the container discs (3, 4) and the brake disc.

Figure 5A:
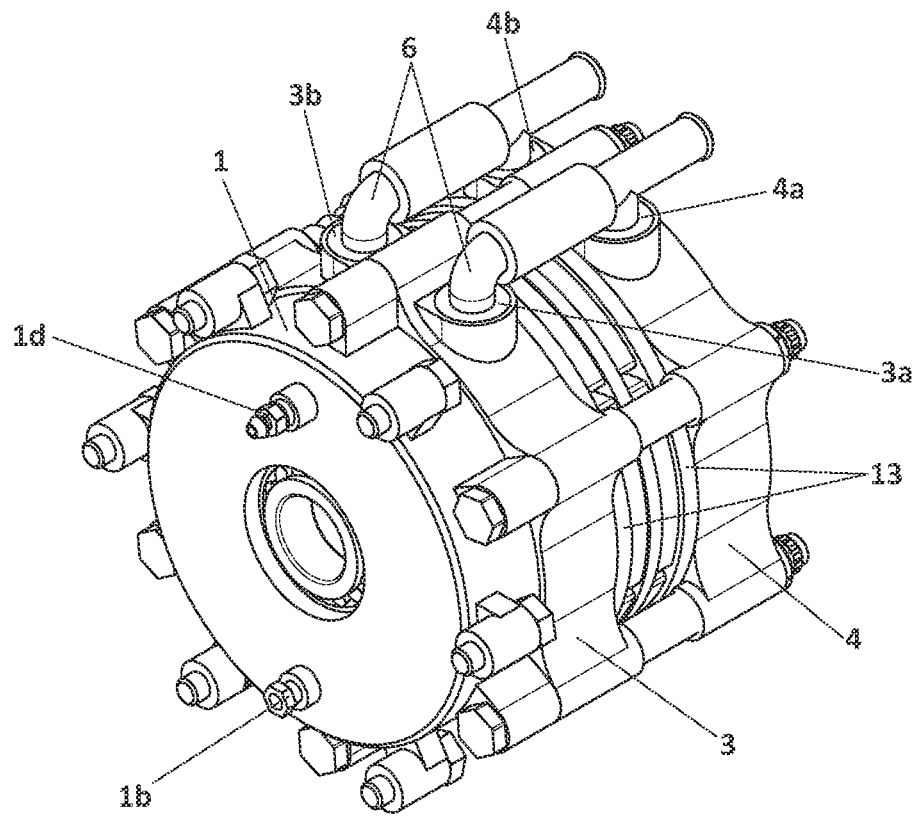
FIG. 5a shows a perspective view of an embodiment of the brake device object of the present disclosure, wherein the casing comprises a bearing in order to be coupled to the driving axle and wherein the container disc comprises an assembled cast iron disc.
Figure 5B:
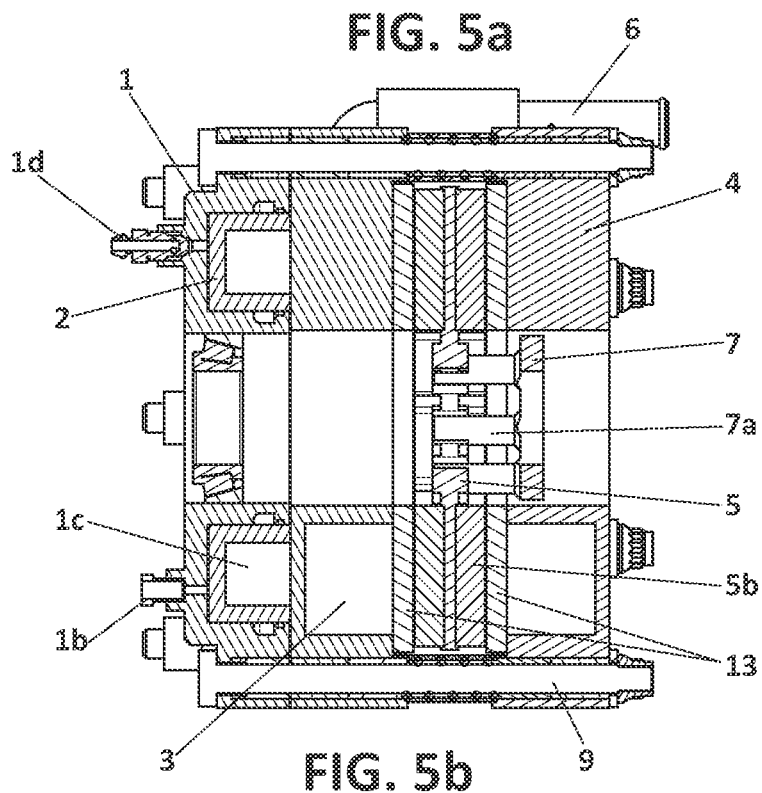
FIG. 5b shows a cross-sectional profile view of an embodiment of the brake device object of the present disclosure, wherein the casing comprises a bearing, specifically a ball bearing, in order to be coupled to the driving axle and wherein the container disc comprises an assembled cast iron disc.

In a preferred embodiment, said casing (1) comprises a second casing hole (1b), positioned on the side opposite from where the inner cavity (1c) is located, connected to a hose, which has the ability to introduce a fluid in the inner cavity (1c), moving the piston (2) in the axial direction, producing the consequent movement of the first container disc (3) towards the first brake disc. FIGS. 5a and 5b also show a bleeder (1d) which enables the outlet of said fluid from the inner cavity (1c).

Figure 3A:
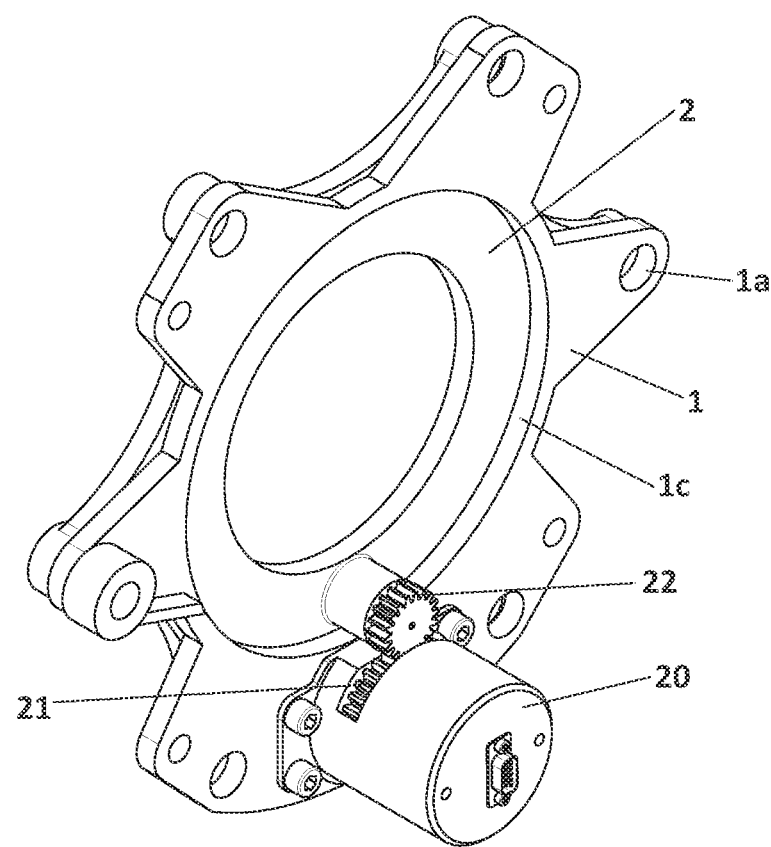
FIG. 3a shows a perspective view of a system for moving the piston with respect to the casing by means of a motor and a gear.
Figure 3B:
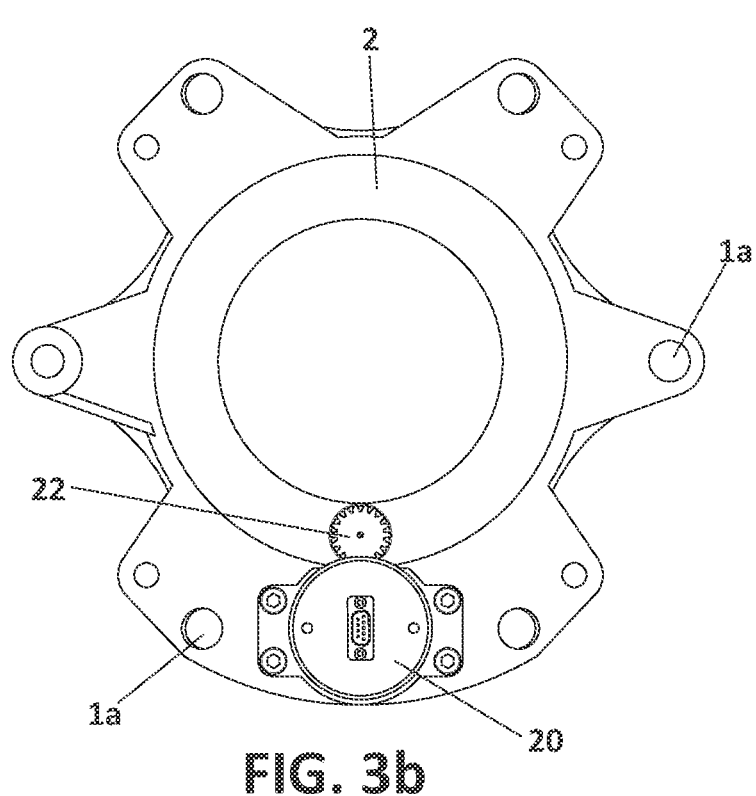
FIG. 3b shows an elevation view of a system for moving the piston with respect to the casing by means of a motor and a gear.
Figure 3C:
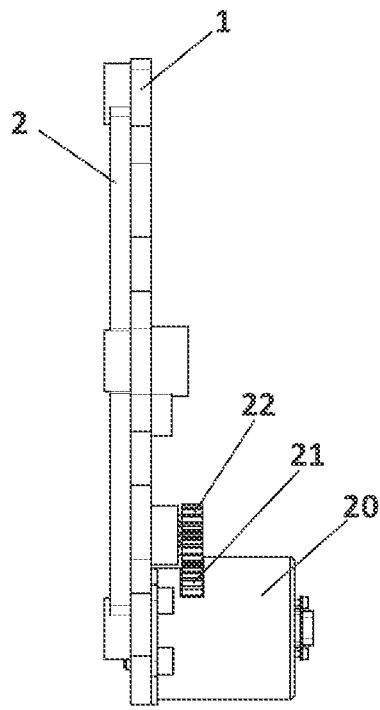
FIG. 3c shows a profile view of a system for moving the piston with respect to the casing by means of a motor and a gear.

In another embodiment, shown in FIGS. 3a-3c, the axial movement of the piston (2) with respect to the casing (1) is performed by means of a gear system and an electric motor (20) assembled on the casing (1).

Said motor (20) drives a gear wheel (21) which is meshed with a pinion (22) which is connected to the piston (2) by means of a helical worm screw. In this manner, when the motor (20) is activated, it moves the gear wheel (21) which transmits the movement to the pinion (22) and when the latter rotates, the piston (2) is moved axially in any direction, depending on the direction of the rotation of the motor (20).

Once the movement of the first container disc (3) and the first brake disc have been performed, the first lining (5a) and the second lining (5b) make contact with the container discs (3, 4), producing the compression which brakes the brake disc, and the pushing load is removed, the container discs (3, 4) recover the initial position thereof, separating from the brake disc. Said recovery movement is performed by six first compression springs (8) arranged between the container discs (3, 4), mounted on other respective six guide screws (9).

In order for the brake disc to separate from the container discs (3, 4, 12) surrounding them, when no pushing pressure is being exerted, the device comprises 12 second springs (23), mounted on the six guide shafts (7a), such that six of said second compression springs (23) are positioned between a first end of each guide shaft (7a) and the supporting disc (5) and the other second compression springs (23) are positioned between the supporting disc (5) and a second end of each guide shaft (7a).

The guide screws (9) are assembled on the casing (1), each of them being inserted into respective first casing holes (1a), to the first container disc (3), being inserted into respective lug holes of the first container disc (3d), positioned in respective perimeter lugs of the first container disc (3c), and to the second container disc (4), being inserted into respective lug holes of the second container disc (4d), positioned in respective perimeter lugs of the second container disc (4c), each screw (9) tightened by a corresponding nut (10).

Figure 7A:
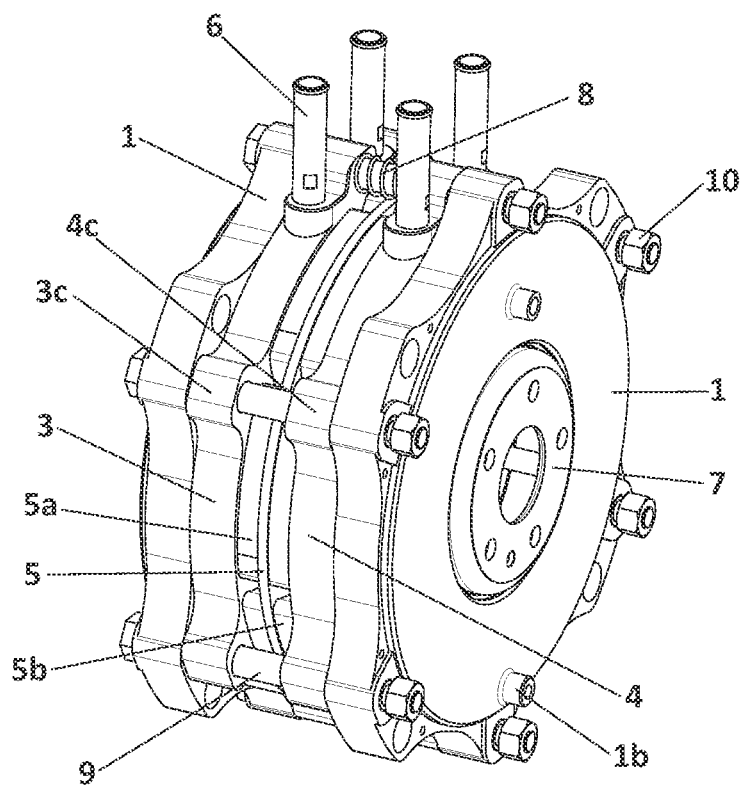
FIG. 7a shows a perspective view of an embodiment of the brake device comprising two casings, each positioned on an outer side of each container disc, in other words, on the side opposite from the contact with the brake disc.

In a non-preferred embodiment, shown in FIG. 7a, the device comprises two casings (1), each positioned on the outer sides of the first container disc (3) and the second container disc (4), in other words, on the side opposite from where the brake discs are located with respect to the container discs (3, 4).

Each of the casings (1) comprises a piston (2) accommodated in the inner cavities (1c) of said casings (1) which are configured to exert a load, each of them, on the container discs (3, 4) moving them in an axial compression movement, such that a tightening is generated on the two linings (5a, 5b) at the same time, without needing the movement of the brake disc axially with respect to the axle (100).

Once the tightening load is to be removed, the fluid is removed from the inner cavity (1c), and the first springs (8) exert a separation load between the two container discs (3, 4), these recovering the initial position thereof.

Figure 7B:
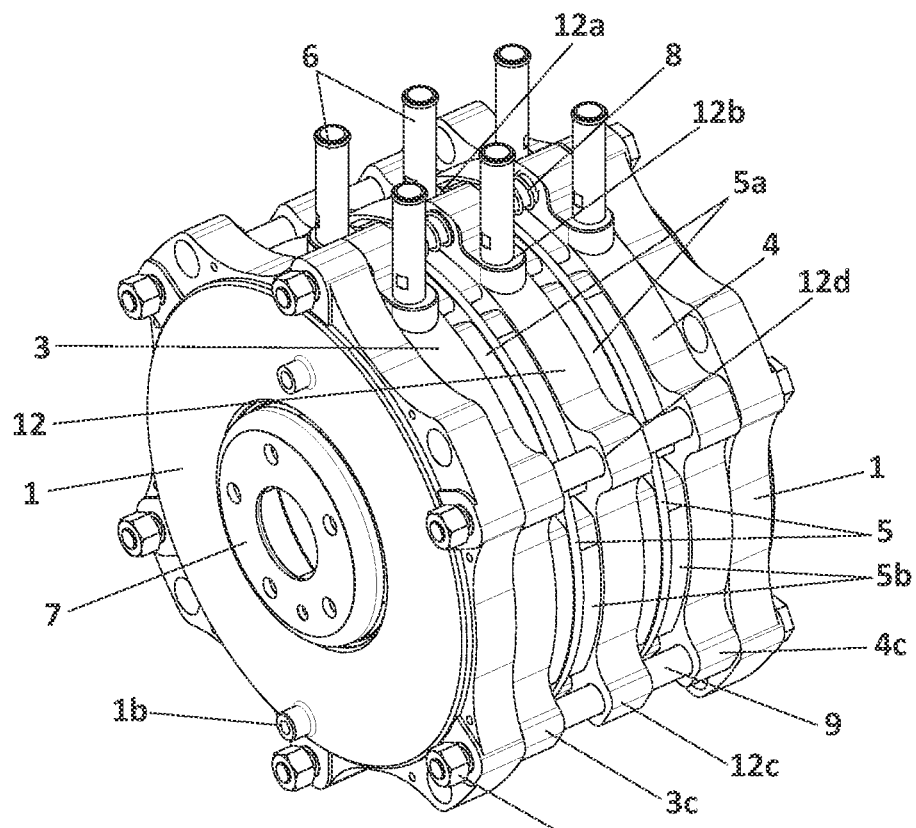
FIG. 7b shows a perspective view of an embodiment of the brake device comprising, in addition to two casings, each one positioned on each side, like in the embodiment of FIG. 7a, a third container disc positioned between the first and the second container discs, and a second brake disc positioned between the second and third container discs.

In another non-preferred embodiment, shown in FIG. 7b, the system comprises a third container disc (12) positioned between the first container disc (3) and the second container disc (4). This third container disc (12) is identical to the two other container discs (3, 4) for which reason it comprises a first hole of the third container disc (12a), through which the coolant is introduced, a second hole of the third container disc (12b), through which six perimeter lugs of the third container disc (12c) are extracted, each comprising a lug hole of the third container disc (12d). Said holes (12d) are fitted to the guide screws (9), in the same manner as the first container disc (3) and the second container disc (4) in the preferred embodiment. Furthermore, between each container disc (3, 4, 12) the device comprises six first compression springs (8), not shown in FIG. 7b, mounted on the guide screws (9).

In this embodiment, the system further comprises a second brake disc positioned between the third container disc (12) and the second container disc (4), said second brake disc being identical to the first brake disc, comprising the same features.

This embodiment operates such that the pistons (2) positioned in the casings (1), next to the first container disc (3) and the second container disc (4), axially move said containers (3, 4) in a compression direction, moving the first brake disc and the second brake disc towards the third container disc (12), producing a double friction of each brake disc with the three container discs (3, 4, 12). In this manner, the friction surface is much larger and the braking of the system is more efficient.

Figure 6:
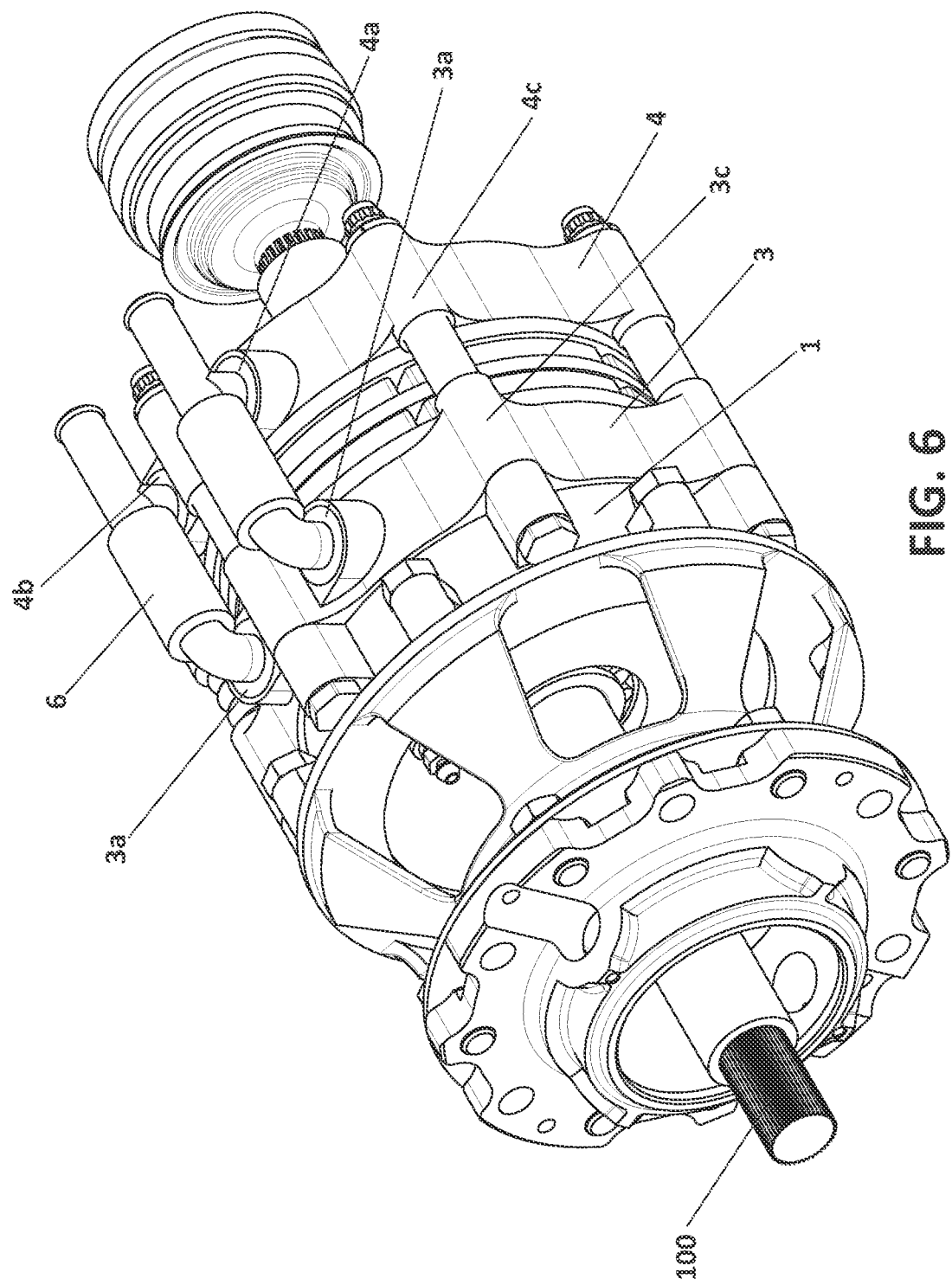
FIG. 6 shows a perspective view of the first embodiment of the brake device object of the present disclosure, wherein the casing can be seen connected to a bell coupling, and this to a differential.

In the embodiment shown in FIGS. 1a-1c, 2, 7a-7b, the container discs (3, 4, 12) are manufactured in a single part or monobloc, while in the embodiment shown in FIGS. 5a-5b and 6, said container discs (3, 4, 12) are manufactured starting from two assembled parts: a cylinder with an open accommodation on one of the bases thereof and a cast iron disc (13) assembled on the open base.

The present disclosure should not be limited to the embodiment described herein. Other configurations may be carried out by those skilled in the art based on the present description. Accordingly, the scope of the present disclosure is defined by the following claims.

The invention claimed is:

1. A brake device, to be installed on a driving axle comprising:
    a first brake disc comprising:
    a supporting disc assembled on the axle, configured to share rotation with said axle and to be moved in an axial direction with respect to the axle;
    a first lining rigidly assembled on a first surface of the supporting disc; and
    a second lining rigidly assembled on a second surface of the supporting disc;
    a first container disc, configured to be moved only in the axial direction of said axle; and
    a second container disc configured to be moved only in the axial direction of said axle or to remain stationary;
    wherein the first brake disc is positioned between the first container disc and the second container disc;
    wherein the first container disc is configured to be moved in the axial direction towards the first lining of the first brake disc;
    wherein,
    the first container disc is configured to exert a pushing pressure on the first lining in the axial direction, generating braking, and moving the first brake disc with respect to the axle towards the second container disc;
    wherein each container disc comprises an inner circuit configured to accommodate the passage of a coolant configured to cool it;

wherein the supporting disc is formed by a cast iron part comprising:
a central disc through hole comprising the axial direction;
a plurality of fins arranged on the perimeter of the central disc through hole; and
at least one sliding joint accommodation, positioned on the perimeter of the central hole, comprising the axial direction; and
wherein the brake device comprises at least one guide disc comprising:
a central through guide hole comprising the axial direction;
at least one guide shaft positioned in a position eccentric to the central guide hole and comprising the axial direction;
wherein the guide disc is rigidly fastened to the axle and is assembled on a supporting disc in a joint sliding in the axial direction, the central guide hole being concentric to the central disc through hole; and
wherein the at least one guide shaft is configured to be accommodated in the at least one accommodation of the supporting disc.

2. The brake device, according to claim 1, wherein the second container disc is configured to be moved in the axial direction towards the second lining of the first brake disc, exerting a pushing pressure on said second lining, and to move said first brake disc with respect to the axle towards the first container disc.

3. The brake device, according to claim 1, comprising:
a third container disc positioned between the first brake disc and the second container disc configured to be moved only in the axial direction of said axle or to remain stationary; and
a second brake disc, jointly assembled on the axle, configured to be moved in the axial direction with respect to said axle, positioned between the second container disc and third container disc;
wherein the third container disc is configured to exert a pushing pressure on the second lining of the first brake disc and on the first lining of the second brake disc, producing the braking of the driving axle.

4. The brake device, according to claim 3, wherein the second container disc is configured to be moved in the axial direction towards the second lining of the second brake disc, exerting a pushing pressure on said second lining, and to move said second brake disc with respect to the axle towards the third container disc.

5. The brake device, according to claim 1, comprising at least one piston configured to generate a pushing load on a container disc positioned on one of the sides of the brake device, moving said container disc in the axial direction along the axle.

6. The brake device, according to claim 5, comprising at least one fixed casing, configured to be rigidly fastened to a frame, and to accommodate the piston in an inner cavity.

7. The brake device, according to claim 6, comprising an electric motor fastened to the at least one casing, configured to actuate a gear which is configured to move the piston in the axial direction, with respect to the casing.

8. The brake device, according to claim 7, wherein the gear comprises a gear wheel connected to the motor and a pinion, meshed with the gear wheel and assembled on the piston by means of a helical worm screw; wherein when the motor is actuated, the gear wheel makes the pinion rotate and the latter produces the movement in the axial direction of the piston.

9. The brake device, according to claim 6, comprising a hose connected to the at least one casing by a second casing hole, configured to introduce a fluid into the inner cavity, moving the piston in the axial direction.

10. The brake device, according to claim 9, comprising tubes which connect the first hole and the second hole of the container discs with a heat exchanger for the coolant.

11. The brake device, according to claim 6, wherein:
the at least one casing comprises a plurality of first casing through holes, arranged on an outer perimeter, and comprising the axial direction; and
the container discs each comprise a plurality of perimeter lugs, each comprising a lug through hole in the axial direction;
wherein the brake device comprises a plurality of guide screws, each of them inserted into a first hole of the at least one casing, and into a lug hole of each of the container discs of the device, wherein said guide screws are configured to guide the movement of said container discs in the axial direction of the axle.

12. The brake device, according to claim 6, wherein at least one of the components selected from the group consisting of a container disc and the at least one casing are coupled to the axle by means of a bearing.

13. The brake device, according to claim 1, comprising at least one first compression spring positioned between each container disc of the device, said first compression spring configured to exert a separating pressure between said container discs.

14. The brake device, according to claim 1, wherein each container disc comprises:
a first hole to access the inner circuit; and
a second hole to access the inner circuit;
wherein the coolant is configured to travel through the inner circuit accessing through the first hole and coming out through the second hole.

15. The brake device, according to claim 14, comprising a plurality of first compression springs, each of them mounted concentrically on each guide screw, said first compression springs positioned between every two container discs arranged contiguously, separated by a brake disc, said first compression springs configured to exert a separating pressure between said container discs.

16. The brake device, according to claim 1, comprising at least one sensor in each of the container discs configured to measure the temperature of the coolant.

17. The brake device, according to claim 1, wherein at least one of the container discs comprises fastening means configured to fasten said container disc to a frame.

18. The brake device, according to claim 1, comprising at least two second compression springs mounted concentrically on each guide shaft, wherein one of said two second compression springs is positioned between a first end of the guide shaft and the supporting disc and the other second compression spring is positioned between the supporting disc and a second end of the guide shaft.

19. The brake device, according to claim 1, comprising a hub rigidly assembled on the axle and on at least one guide disc.

20. The brake device, according to claim 1, wherein each of the container discs is formed by a hollow cylinder manufactured in a single part, by casting, and comprises a central container through hole and at least one internal wall configured so that the inner circuit surrounds an entire inner perimeter of the container disc.

21. The brake device, according to claim 1, wherein each of the container discs is formed by a cylinder with an open accommodation on one of the bases thereof, manufactured in a single part, by casting, comprising a C-shaped cross section, assembled on a cast iron disc through the open base thereof, wherein the assembly between the container disc and the cast iron disc comprise a hollow cylinder with a central container through hole and at least one internal wall configured so that the inner circuit surrounds an entire inner perimeter of the container disc.

\* \* \* \* \*